United States Patent
Kim

(10) Patent No.: US 11,812,494 B2
(45) Date of Patent: Nov. 7, 2023

(54) METHOD AND APPARATUS FOR MULTI-SIM OPERATION BASED ON REPORTING ON TERMINAL STATE IN MOBILE WIRELESS COMMUNICATION SYSTEM

(71) Applicants: BLACKPIN INC., Seoul (KR); Soenghun Kim, Gyeonggi-do (KR)

(72) Inventor: Soenghun Kim, Gyeonggi-do (KR)

(73) Assignees: BLACKPIN INC., Seoul (KR); Soenghun Kim, Gyeonggi-do (KR)

( * ) Notice: Subject to any disclaimer, the term of this patent is extended or adjusted under 35 U.S.C. 154(b) by 0 days.

(21) Appl. No.: 18/132,432

(22) Filed: Apr. 10, 2023

(65) Prior Publication Data

US 2023/0247714 A1  Aug. 3, 2023

Related U.S. Application Data

(63) Continuation of application No. PCT/KR2022/019710, filed on Dec. 6, 2022.

(30) Foreign Application Priority Data

Dec. 29, 2021  (KR) .......................... 10-2021-0191549

(51) Int. Cl.
*H04W 76/27* (2018.01)

(52) U.S. Cl.
CPC .................... *H04W 76/27* (2018.02)

(58) Field of Classification Search
CPC ...... H04W 76/27; H04W 76/15; H04W 88/06
See application file for complete search history.

(56) References Cited

U.S. PATENT DOCUMENTS

2023/0144750 A1* 5/2023 Agiwal .................. H04W 48/12
455/422.1

FOREIGN PATENT DOCUMENTS

| KR | 10-2018-0018303 A | 2/2018 |
| KR | 10-2020-0034647 A | 9/2019 |
| KR | 10-2021-0034477 A | 3/2021 |
| KR | 10-2021-0125854 A | 10/2021 |

(Continued)

OTHER PUBLICATIONS

LTE; Evolved Universal Terrestrial Radio Access (E-UTRA); Radio Resource Control (RRC); Protocol specification, 3GPP TS 36.331 version 11.7.0 Release 11, Mar. 26, 2014.

(Continued)

*Primary Examiner* — Nam T Huynh
(74) *Attorney, Agent, or Firm* — Nicholas Park

(57) ABSTRACT

A method and apparatus for Multi-SIM operation based on reporting on terminal state is provided. Method for Multi-SIM operation based on reporting on terminal state includes receiving from a base station a first RRCReconfiguration, transmitting to the base station a UEAssistanceInformation, starting the first timer after initiating transmission of UEAssistanceInformation, receiving from the base station a second RRCReconfiguration, transmitting to the base station a RRCReconfigurationComplete in response to the second RRCReconfiguration and starting the first timer if the reconfigurationWithSync was included in a masterCellGroup in the second RRCReconfiguration and if the terminal initiated transmission of the UEAssistanceInformation during a specific time period.

3 Claims, 7 Drawing Sheets

(56) References Cited

FOREIGN PATENT DOCUMENTS

| KR | 10-2021-0143047 A | 11/2021 |
| WO | WO-2023075136 A1 * | 5/2023 |

OTHER PUBLICATIONS

5G; LTE; 5GS; User Equipment (UE) conformance specification; Part 1: Protocol, 3GPP TS 38.523-1 version 16.9.0 Release 16, Dec. 15, 2021.

LTE; Evolved Universal Terrestrial Radio Access (E-UTRA) and Evolved Universal Terrestrial Radio Access Network E-UTRAN); Overall description; Stage 2, 3GPP TS 36.300 version 16.6.0 Release 16, Sep. 9, 2021.

3rd Generation Partnership Project; Technical Specification Group Radio Access Network;NR;Radio Resource Control (RRC) protocol specification (Release 16), 3GPP TS 38.331 V16.6.0, Sep. 2021.

Nokia, Nokia Shanghai Bell, Remaining aspects for switching notification without leaving RRC_CONNECTED, R2-2110142, 3GPP TSG-RAN WG2 Meeting #116 Electronic, Oct. 22, 2021.

Vivo, Running NR RRC CR for Musim, R2-2110390, 3GPP TSSG-RAN WG2 Meeting #116-e, Oct. 22, 2021.

Huawei, HiSilicon, Discussion on the remaining issues for NW switching, R2-2110542, 3GPP TSG-RAN WG2 Meeting #116 electronic, Oct. 22, 2021.

Ericsson, Discussion on switchover procedure without leaving RRC_CONNECTED state, R2-2110775, 3GPP TSG-RAN WG2 #116e, Oct. 21, 2021.

Ericsson, Discussion on switchover procedure for leaving RRC_CONNECTED state, R2_2110781, 3GPP TSG-RAN WG2 #116e, Oct. 21, 2021.

Vivo, Running NR RRC CR for Musim, R2-2111602, 3GPP TSG-RAN WG2 Meeting #116-e, Nov. 20, 2021.

* cited by examiner

User Plane Protocol Stack

Control Plane Protocol Stack

METHOD AND APPARATUS FOR MULTI-SIM OPERATION BASED ON REPORTING ON TERMINAL STATE IN MOBILE WIRELESS COMMUNICATION SYSTEM

CROSS-REFERENCE TO RELATED APPLICATION

This application is a US Bypass Continuation Application of International Application No. PCT/KR2022/019710, filed on Dec. 6, 2022, which claims priority to and the benefit of Korean Patent Application No. 10-2021-0191549, filed on Dec. 29, 2021, the disclosure of which is incorporated herein by reference in its entirety.

BACKGROUND

To meet the increasing demand for wireless data traffic since the commercialization of 4th generation (4G) communication systems, the 5th generation (5G) system is being developed. For the sake of high, 5G system introduced millimeter wave (mmW) frequency bands (e. g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability. To facilitate introduction of various services, 5G communication system targets supporting higher data rate and smaller latency.

Multi-USIM devices are being more and more popular in many countries. The user may have both a personal and a business subscription in one device or has two personal subscriptions in one device for different services. However, support for multi-USIM within a device is currently handled in an implementation-specific manner without any support from 3GPP specifications, resulting in a variety of implementations and UE behaviors. Standardiz2A-ing support for such UE's can prove beneficial from a performance perspective in that network functionality can be based on predictable UE behavior.

SUMMARY

Aspects of the present disclosure are to address the problems of state transition from RRC_INACTIVE to RRC_CONNECTED for data transfer. Accordingly, an aspect of the present disclosure is to provide a method and an apparatus for data transfer in RRC_INACTIVE state. In accordance with an aspect of the present disclosure, a method of a terminal in mobile communication system is provided. In the method, UE receives from a first base station a RRCRelease message including a first information for a second resume procedure, receives from a second base station a system information including a second information for a second resume procedure and triggers a PHR. The triggered PHR is canceled if specific conditions are fulfilled.

DETAILED DESCRIPTION

Figure 1A:
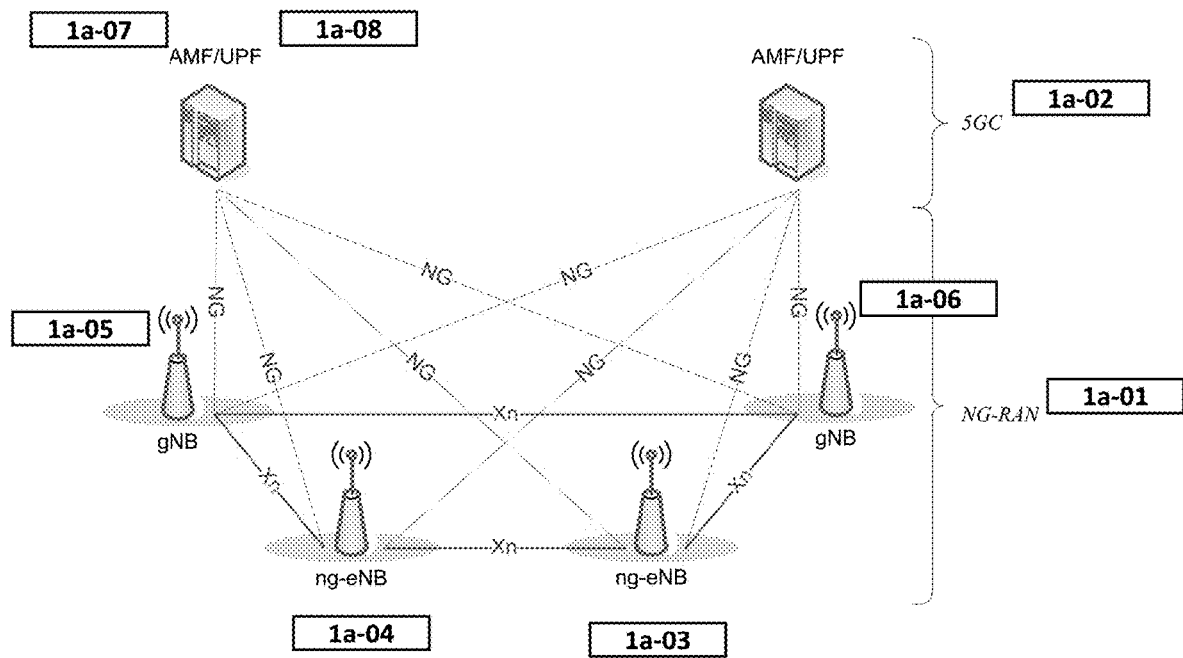
FIG. 1A is a diagram illustrating the architecture of an 5G system and a NG-RAN to which the disclosure may be applied.

Hereinafter, embodiments of the present invention will be described in detail with reference to the accompanying drawings. In addition, in the description of the present invention, if it is determined that a detailed description of a related known function or configuration may unnecessarily obscure the gist of the present invention, the detailed description thereof will be omitted. In addition, the terms to be described later are terms defined in consideration of functions in the present invention, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the 3GPP standards are used for convenience of explanation. However, the present disclosure is not limited by use of these terms and definitions and other arbitrary terms and definitions may be employed instead.

Table 1 lists the acronyms used throughout the present disclosure.

TABLE 1

| Acronym | Full name |
| --- | --- |
| 5GC | 5G Core Network |
| ACK | Acknowledgement |
| AM | Acknowledged Mode |
| AMF | Access and Mobility Management Function |
| ARQ | Automatic Repeat Request |
| AS | Access Stratum |
| ASN.1 | Abstract Syntax Notation One |
| BSR | Buffer Status Report |
| BWP | Bandwidth Part |
| CA | Carrier Aggregation |
| CAG | Closed Access Group |
| CG | Cell Group |
| C-RNTI | Cell RNTI |
| CSI | Channel State Information |
| DCI | Downlink Control Information |
| DRB | (user) Data Radio Bearer |
| DRX | Discontinuous Reception |
| HARQ | Hybrid Automatic Repeat Request |
| IE | Information element |
| LCG | Logical Channel Group |
| MAC | Medium Access Control |
| MIB | Master Information Block |
| NAS | Non-Access Stratum |
| NG-RAN | NG Radio Access Network |

TABLE 1-continued

| Acronym | Full name |
| --- | --- |
| NR | NR Radio Access |
| PBR | Prioritised Bit Rate |
| PCell | Primary Cell |
| PCI | Physical Cell Identifier |
| PDCCH | Physical Downlink Control Channel |
| PDCP | Packet Data Convergence Protocol |
| PDSCH | Physical Downlink Shared Channel |
| PDU | Protocol Data Unit |
| PHR | Power Headroom Report |
| PLMN | Public Land Mobile Network |
| PRACH | Physical Random Access Channel |
| PRB | Physical Resource Block |
| PSS | Primary Synchronisation Signal |
| PUCCH | Physical Uplink Control Channel |
| PUSCH | Physical Uplink Shared Channel |
| RACH | Random Access Channel |
| RAN | Radio Access Network |
| RA-RNTI | Random Access RNTI |
| RAT | Radio Access Technology |
| RB | Radio Bearer |
| RLC | Radio Link Control |
| RNA | RAN-based Notification Area |
| RNAU | RAN-based Notification Area Update |
| RNTI | Radio Network Temporary Identifier |
| RRC | Radio Resource Control |
| RRM | Radio Resource Management |
| RSRP | Reference Signal Received Power |
| RSRQ | Reference Signal Received Quality |
| RSSI | Received Signal Strength Indicator |
| SCell | Secondary Cell |
| SCS | Subcarrier Spacing |
| SDAP | Service Data Adaptation Protocol |
| SDU | Service Data Unit |
| SFN | System Frame Number |
| S-GW | Serving Gateway |
| SI | System Information |
| SIB | System Information Block |
| SpCell | Special Cell |
| SRB | Signalling Radio Bearer |
| SRS | Sounding Reference Signal |
| SSB | SS/PBCH block |
| SSS | Secondary Synchronisation Signal |
| SUL | Supplementary Uplink |
| TM | Transparent Mode |
| UCI | Uplink Control Information |
| UE | User Equipment |
| UM | Unacknowledged Mode |

Table 2 lists the terminologies and their definition used throughout the present disclosure.

TABLE 2

| Terminology | Definition |
| --- | --- |
| allowedCG-List | List of configured grants for the corresponding logical channel. This restriction applies only when the UL grant is a configured grant. If present, UL MAC SDUs from this logical channel can only be mapped to the indicated configured grant configuration. If the size of the sequence is zero, then UL MAC SDUs from this logical channel cannot be mapped to any configured grant configurations. If the field is not present, UL MAC SDUs from this logical channel can be mapped to any configured grant configurations. |
| allowedSCS-List | List of allowed sub-carrier spacings for the corresponding logical channel. If present, UL MAC SDUs from this logical channel can only be mapped to the indicated numerology. Otherwise, UL MAC SDUs from this logical channel can be mapped to any configured numerology. |
| allowedServingCells | List of allowed serving cells for the corresponding logical channel. If present, UL MAC SDUs from this logical channel can only be mapped to the serving cells indicated in this list. Otherwise, UL MAC SDUs from this logical channel can be mapped to any configured serving cell of this cell group. |
| Carrier frequency | center frequency of the cell. |
| Cell | combination of downlink and optionally uplink resources. The linking between the carrier frequency of the downlink resources and the carrier frequency of the uplink resources is indicated in the system information transmitted on the downlink resources. |
| Cell Group | in dual connectivity, a group of serving cells associated with either the MeNB or the SeNB. |
| Cell reselection | A process to find a better suitable cell than the current serving cell based on the system information received in the current serving cell |
| Cell selection | A process to find a suitable cell either blindly or based on the stored information |
| Dedicated signalling | Signalling sent on DCCH logical channel between the network and a single UE. |
| discardTimer | Timer to control the discard of a PDCP SDU. Starting when the SDU arrives. Upon expiry, the SDU is discarded. |
| F | The Format field in MAC subheader indicates the size of the Length field. |
| Field | The individual contents of an information element are referred to as fields. |
| Frequency layer | set of cells with the same carrier frequency. |
| Global cell identity | An identity to uniquely identifying an NR cell. It is consisted of cellIdentity and plmn-Identity of the first PLMN-Identity in plmn-IdentityList in SIB1. |
| gNB | node providing NR user plane and control plane protocol terminations towards the UE, and connected via the NG interface to the 5GC. |

TABLE 2-continued

| Terminology | Definition |
| --- | --- |
| Handover | procedure that changes the serving cell of a UE in RRC_CONNECTED. |
| Information element | A structural element containing single or multiple fields is referred as information element. |
| L | The Length field in MAC subheader indicates the length of the corresponding MAC SDU or of the corresponding MAC CE |
| LCID | 6 bit logical channel identity in MAC subheader to denote which logical channel traffic or which MAC CE is included in the MAC subPDU |
| MAC-I | Message Authentication Code-Integrity. 16 bit or 32 bit bit string calculated by NR Integrity Algorithm based on the security key and various fresh inputs |
| Logical channel | a logical path between a RLC entity and a MAC entity. There are multiple logical channel types depending on what type of information is transferred e.g. CCCH (Common Control Channel), DCCH (Dedicate Control Channel), DTCH (Dedicate Traffic Channel), PCCH (Paging Control Channel) |
| LogicalChannelConfig | The IE LogicalChannelConfig is used to configure the logical channel parameters. It includes priority, prioritisedBitRate, allowedServingCells, allowedSCS-List, maxPUSCH-Duration, logicalChannelGroup, allowedCG-List etc |
| logicalChannelGroup | ID of the logical channel group, as specified in TS 38.321, which the logical channel belongs to |
| MAC CE | Control Element generated by a MAC entity. Multiple types of MAC CEs are defined, each of which is indicated by corresponding LCID. A MAC CE and a corresponding MAC sub-header comprises MAC subPDU |
| Master Cell Group | in MR-DC, a group of serving cells associated with the Master Node, comprising of the SpCell (PCell) and optionally one or more SCells. |
| maxPUSCH-Duration | Restriction on PUSCH-duration for the corresponding logical channel. If present, UL MAC SDUs from this logical channel can only be transmitted using uplink grants that result in a PUSCH duration shorter than or equal to the duration indicated by this field. Otherwise, UL MAC SDUs from this logical channel can be transmitted using an uplink grant resulting in any PUSCH duration. |
| NR | NR radio access |
| PCell | SpCell of a master cell group. |
| PDCP entity reestablishment | The process triggered upon upper layer request. It includes the initialization of state variables, reset of header compression and manipulating of stored PDCP SDUs and PDCP PDUs. The details can be found in 5.1.2 of 38.323 |
| PDCP suspend | The process triggered upon upper layer request. When triggered, transmitting PDCP entity set TX_NEXT to the initial value and discard all stored PDCP PDUs. The receiving entity stop and reset t-Reordering, deliver all stored PDCP SDUs to the upper layer and set RX_NEXT and RX_DELIV to the initial value |
| PDCP-config | The IE PDCP-Config is used to set the configurable PDCP parameters for signalling and data radio bearers. For a data radio bearer, discardTimer, pdcp-SN-Size, header compression parameters, t-Reordering and whether integrity protection is enabled are configured. For a signaling radio bearer, t-Reordering can be configured |
| PLMN ID Check | the process that checks whether a PLMN ID is the RPLMN identity or an EPLMN identity of the UE. |
| Primary Cell | The MCG cell, operating on the primary frequency, in which the UE either performs the initial connection establishment procedure or initiates the connection re-establishment procedure. |
| Primary SCG Cell | For dual connectivity operation, the SCG cell in which the UE performs random access when performing the Reconfiguration with Sync procedure. |
| priority | Logical channel priority, as specified in TS 38.321. an integer between 0 and 7. 0 means the highest priority and 7 means the lowest priority |
| PUCCH SCell | a Secondary Cell configured with PUCCH. |
| Radio Bearer | Logical path between a PDCP entity and upper layer (i.e. SDAP entity or RRC) |
| RLC bearer | RLC and MAC logical channel configuration of a radio bearer in one cell group. |
| RLC bearer configuration | The lower layer part of the radio bearer configuration comprising the RLC and logical channel configurations. |
| RX_DELIV | This state variable indicates the COUNT value of the first PDCP SDU not delivered to the upper layers, but still waited for. |
| RX_NEXT | This state variable indicates the COUNT value of the next PDCP SDU expected to be received. |
| RX_REORD | This state variable indicates the COUNT value following the COUNT value associated with the PDCP Data PDU which triggered t-Reordering. |

TABLE 2-continued

| Terminology | Definition |
| --- | --- |
| Serving Cell | For a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. |
| SpCell | primary cell of a master or secondary cell group. |
| Special Cell | For Dual Connectivity operation the term Special Cell refers to the PCell of the MCG or the PSCell of the SCG, otherwise the term Special Cell refers to the PCell. |
| SRB | Signalling Radio Bearers" (SRBs) are defined as Radio Bearers (RBs) that are used only for the transmission of RRC and NAS messages. |
| SRB0 | SRB0 is for RRC messages using the CCCH logical channel |
| SRB1 | SRB1 is for RRC messages (which may include a piggybacked NAS message) as well as for NAS messages prior to the establishment of SRB2, all using DCCH logical channel; |
| SRB2 | SRB2 is for NAS messages and for RRC messages which include logged measurement information, all using DCCH logical channel. SRB2 has a lower priority than SRB1 and may be configured by the network after AS security activation; |
| SRB3 | SRB3 is for specific RRC messages when UE is in (NG)EN-DC or NR-DC, all using DCCH logical channel |
| SRB4 | SRB4 is for RRC messages which include application layer measurement reporting information, all using DCCH logical channel. |
| Suitable cell | A cell on which a UE may camp. Following criteria apply<br>The cell is part of either the selected PLMN or the registered PLMN or PLMN of the Equivalent PLMN list<br>The cell is not barred<br>The cell is part of at least one TA that is not part of the list of "Forbidden Tracking Areas for Roaming" (TS 22.011 [18]), which belongs to a PLMN that fulfils the first bullet above.<br>The cell selection criterion S is fulfilled (i.e. RSRP and RSRQ are better than specific values |
| t-Reordering | Timer to control the reordering operation of received PDCP packets. Upon expiry, PDCP packets are processed and delivered to the upper layers. |
| TX_NEXT | This state variable indicates the COUNT value of the next PDCP SDU to be transmitted. |
| UE Inactive AS Context | UE Inactive AS Context is stored when the connection is suspended and restored when the connection is resumed. It includes information below.<br>the current KgNB and KRRCint keys, the ROHC state, the stored QoS flow to DRB mapping rules, the C-RNTI used in the source PCell, the cellIdentity and the physical cell identity of the source PCell, the spCellConfigCommon within ReconfigurationWithSync of the NR PSCell (if configured) and all other parameters configured except for: parameters within ReconfigurationWithSync of the PCell; parameters within ReconfigurationWithSync of the NR PSCell, if configured;<br>parameters within MobilityControlInfoSCG of the E-UTRA PSCell, if configured;<br>servingCellConfigCommonSIB; |

In the present invention, "trigger" or "triggered" and "initiate" or "initiated" may be used in the same meaning.

In the present invention, "radio bearers allowed for the second resume procedure", "radio bearers for which the second resume procedure is set", and "radio bearers for which the second resume procedure is enabled" may all have the same meaning.

FIG. 1A is a diagram illustrating the architecture of an 5G system and a NG-RAN to which the disclosure may be applied.

5G system consists of NG-RAN 1a-01 and 5GC 1a-02. An NG-RAN node is either:
A gNB, providing NR user plane and control plane protocol terminations towards the UE; or
An ng-eNB, providing E-UTRA user plane and control plane protocol terminations towards the UE.

The gNBs 1a-05 or 1a-06 and ng-eNBs 1a-03 or 1a-04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1a-07 and UPF 1a-08 may be realized as a physical node or as separate physical nodes.

A gNB 1a-05 or 1a-06 or an ng-eNBs 1a-03 or 1a-04 hosts the functions listed below.

Functions for Radio Resource Management such as Radio Bearer Control, Radio Admission Control, Connection Mobility Control, Dynamic allocation of resources to UEs in uplink, downlink and sidelink(scheduling); and IP and Ethernet header compression, uplink data decompression and encryption of user data stream; and Selection of an AMF at UE attachment when no routing to an MME can be determined from the information provided by the UE; and Routing of User Plane data towards UPF; and Scheduling and transmission of paging messages; and Scheduling and transmission of broadcast information (originated from the AMF or O&M); and Measurement and measurement reporting configuration for mobility and scheduling; and Session Management; and QoS Flow management and mapping to data radio bearers; and Support of UEs in RRC_INACTIVE state; and Radio access network sharing; and Tight interworking between NR and E-UTRA; and Support of Network Slicing.

The AMF 1a-07 hosts the functions such as NAS signaling, NAS signaling security, AS security control, SMF selection, Authentication, Mobility management and positioning management.

The UPF 1a-08 hosts the functions such as packet routing and forwarding, transport level packet marking in the uplink, QoS handling and the downlink, mobility anchoring for mobility etc.

Figure 1B:
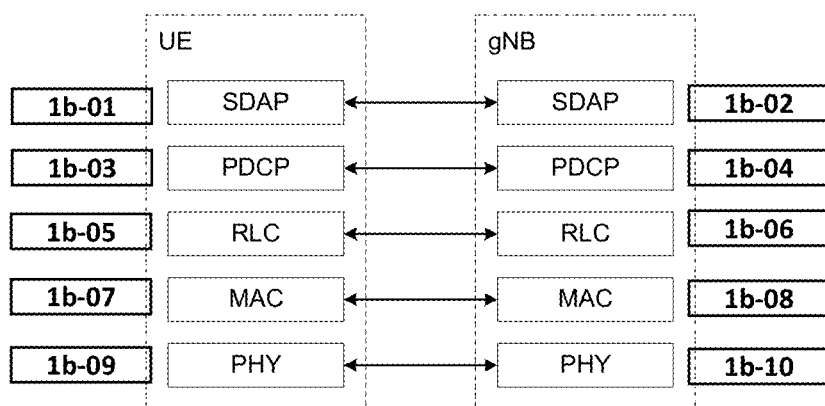
FIG. 1B is a diagram illustrating a wireless protocol architecture in an 5G system to which the disclosure may be applied.
Figure 1B:
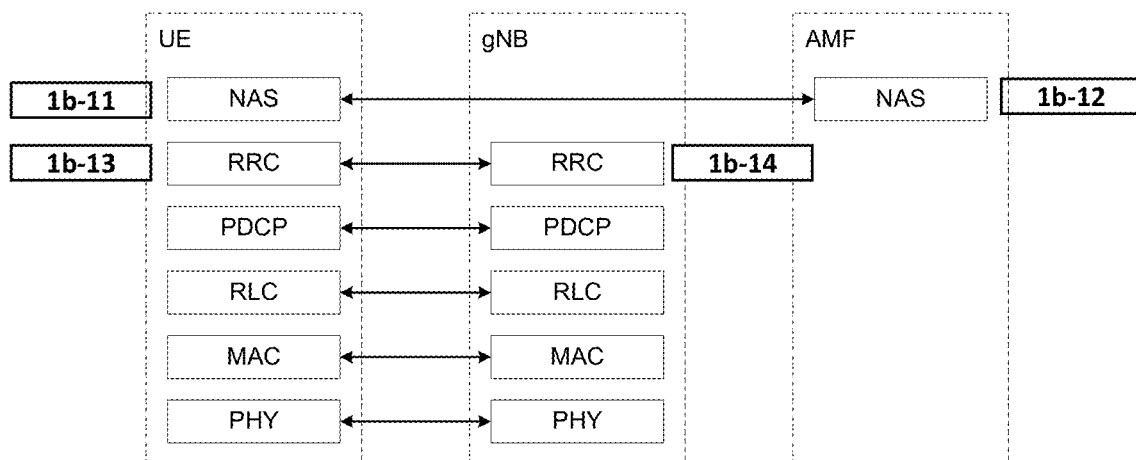

FIG. 1B is a diagram illustrating a wireless protocol architecture in an 5G system to which the disclosure may be applied.

User plane protocol stack consists of SDAP 1b-01 or 1b-02, PDCP 1b-03 or 1b-04, RLC 1b-05 or 1b-06, MAC 1b-07 or 1b-08 and PHY 1b-09 or 1b-10. Control plane protocol stack consists of NAS 1b-11 or 1b-11b-, RRC 1b-13 or 1b-14, PDCP, RLC, MAC and PHY.

Each protocol sublayer performs functions related to the operations listed in the Table 3.

TABLE 3

| Sublayer | Functions |
|---|---|
| NAS | authentication, mobility management, security control etc |
| RRC | System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc. |
| SDAP | Mapping between a QoS flow and a data radio bearer, Marking QoS flow ID (QFI) in both DL and UL packets. |
| PDCP | Transfer of data, Header compression and decompression, Ciphering and deciphering, Integrity protection and integrity verification, Duplication, Reordering and in-order delivery, Out-of-order delivery etc. |
| RLC | Transfer of upper layer PDUs, Error Correction through ARQ, Segmentation and re-segmentation of RLC SDUs, Reassembly of SDU, RLC re-establishment etc. |
| MAC | Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc. |
| PHY | Channel coding, Physical-layer hybrid-ARQ processing, Rate matching, Scrambling, Modulation, Layer mapping, Downlink Control Information, Uplink Control Information etc. |

The terminal supports three RRC states. Table 4 lists the characteristics of each state.

TABLE 4

| RRC state | Characteristic |
|---|---|
| RRC_IDLE | PLMN selection; Broadcast of system information; Cell re-selection mobility; Paging for mobile terminated data is initiated by 5GC; DRX for CN paging configured by NAS. |
| RRC_INACTIVE | PLMN selection; Broadcast of system information; Cell re-selection mobility; Paging is initiated by NG-RAN (RAN paging); RAN-based notification area (RNA) is managed by NG-RAN; DRX for RAN paging configured by NG-RAN; 5GC - NG-RAN connection (both C/U-planes) is established for UE; The UE AS context is stored in NG-RAN and the UE; NG-RAN knows the RNA which the UE belongs to. |
| RRC_CONNECTED | 5GC - NG-RAN connection (both C/U-planes) is established for UE; The UE AS context is stored in NG-RAN and the UE; NG-RAN knows the cell which the UE belongs to; Transfer of unicast data to/from the UE; Network controlled mobility including measurements. |

Figure 1C:
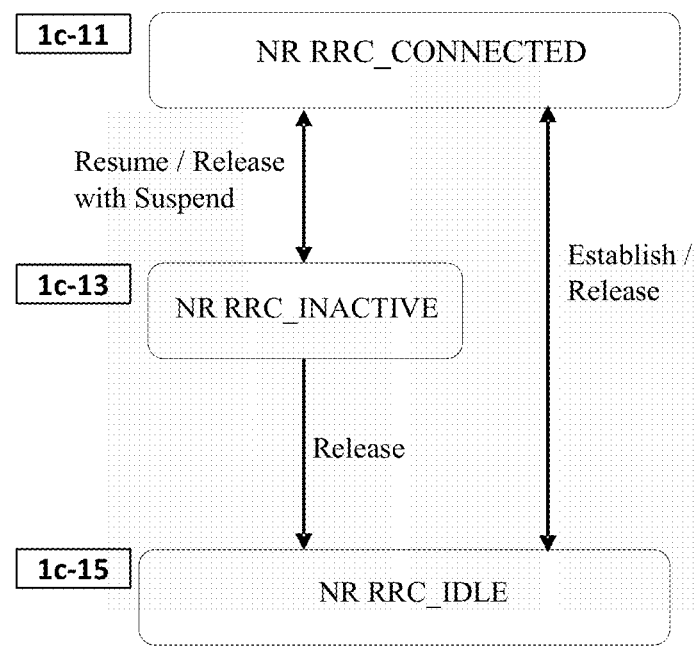
FIG. 1C is a diagram illustrating an RRC state transition.

FIG. 1C is a diagram illustrating an RRC state transition.

Between RRC_CONNECTED 1c-11 and RRC_INACTIVE 1c-13, a state transition occurs due to the exchange of the Resume message and the Release message containing the Suspend IE.

A state transition occurs between RRC_CONNECTED 1c-11 and RRC_IDLE 1c-15 through RRC connection establishment and RRC connection release.

Figure 2:
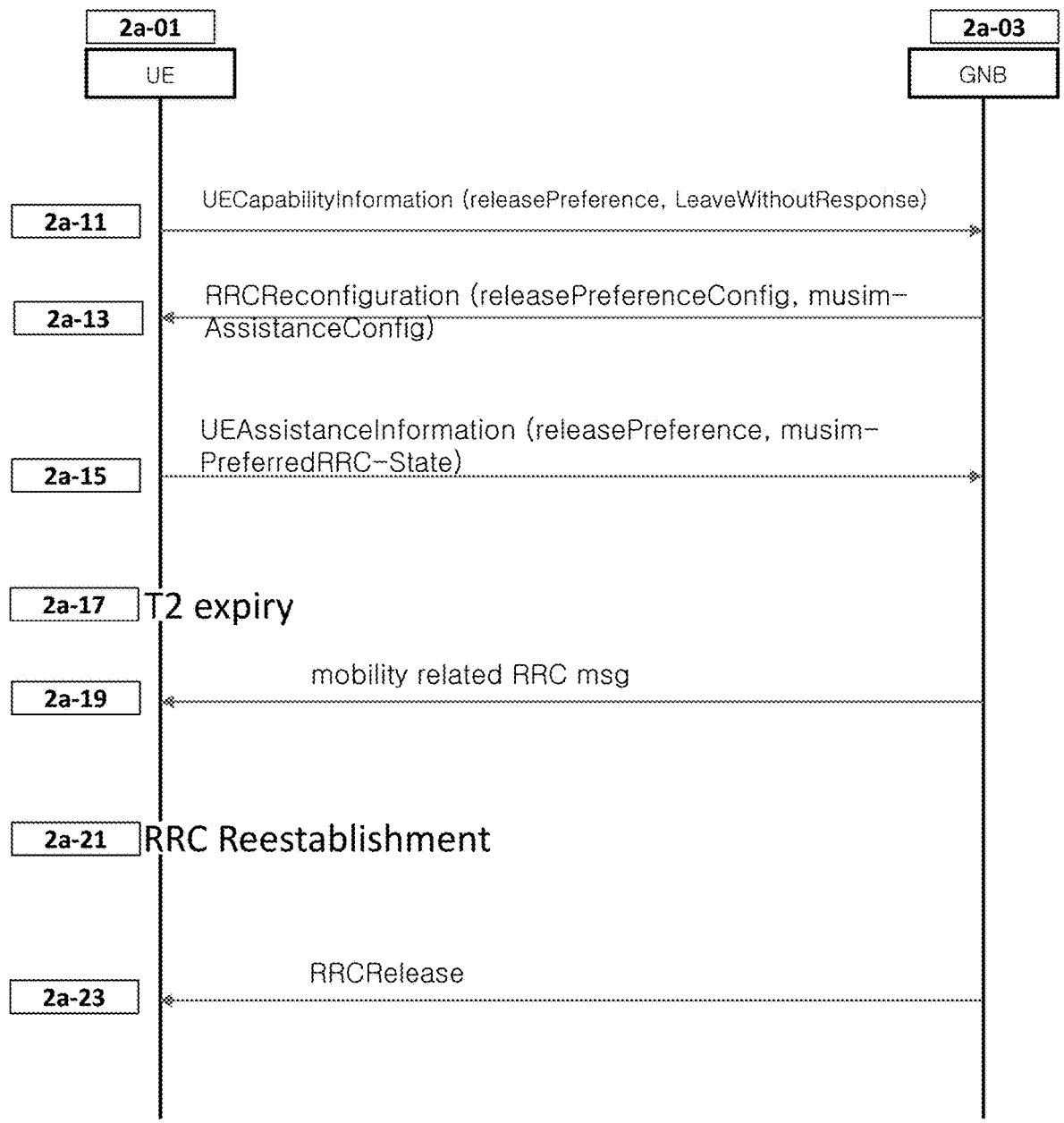
FIG. 2 is a diagram illustrating operations of a terminal and a base station according to an embodiment of the present invention.

FIG. 2 is a diagram illustrating operation of UE and base station.

In 2a-11, UE 2a-01 transmits to GNB 2a-03 UECapabilityInformation. UECapabilityInformation message is used to transfer UE radio access capabilities requested by the network.

UE may include in the message releasePreference capability IE and releaseRequest capability IE. releasePreference IE indicates whether the UE supports providing its preference assistance information to transition out of RRC_CONNECTED for power saving. releaseRequest IE indicates whether the UE supports providing its assistance information to request transition out of RRC_CONNECTED for MUSIM.

UECapabilityInformation message includes a UE-NR-Capability IE. A UE-NR-Capability IE includes plurality of non-critical extensions. Non-critical extensions are characterised by the addition of new information to the original specification of the PDU type. If not comprehended, a non-critical extension may be skipped by the decoder, whilst the decoder is still able to complete the decoding of the comprehended parts of the PDU contents.

Non-critical extensions for UE-NR-Capability are defined release basis. A NCE for later release is placed later than a NCE for earlier release.

ReleasePreference capability IE and releaseReqeust capability IE are placed under different non-critical extensions.

ReleaseRequest capability IE is enumerated with a single value of "supported". If UE includes releaseRequest capability IE in a NCE of UE-NR-Capability, UE supports the functionality of releaseRequest IE for both FDD and TDD and for both FR1 and FR2.

GNB determines the configuration to be applied to the UE based on the capability information received in 2a-11.

GNB generates RRCReconfiguration message based on the determined configuration.

In 2a-13, GNB transmits to UE RRCReconfiguration. The RRCReconfiguration message is the command to modify an RRC connection. It may convey information for measurement configuration, mobility control, radio resource configuration (including RB s, MAC main configuration and physical channel configuration) and AS security configuration.

GNB may include the UE assistance information configuration such as releasePreferenceConfig IE or musim-AssistanceConfig IE in the message. releasePreferenceConfig IE is configuration for the UE to report assistance information to inform the gNB about the UE's preference to leave RRC_CONNECTED state. releasePreferenceConfig IE includes releasePreferenceProhibitTimer which is a prohibit timer for release preference assistance information reporting. musim-AssistanceConfig IE is configuration for the UE to report assistance information for MUSIM. musim-AssistanceConfig IE includes musim-LeaveWithoutResponseTimer, which indicates the timer for UE to leave RRC_CONNECTED without network response.

UE consider itself to be configured to provide assistance information to transition out of RRC_CONNECTED if the received otherConfig of RRCReconfiguration message includes the releasePreferenceConfig and if releasePreferenceConfig is set to setup.

UE consider itself to be configured to provide MUSIM assistance information if the received otherConfig of RRCReconfiguration includes the musim-AssistanceConfig and if musim-AssistanceConfig is set to setup.

In 2a-15, UE initiates UE Assistance Information procedure to inform the network of its preference on the RRC state or its MUSIM assistance information.

A UE capable of providing assistance information to transition out of RRC_CONNECTED state may initiate the procedure if it was configured to do so, upon determining that it prefers to transition out of RRC_CONNECTED state, or upon change of its preferred RRC state.

A UE capable of providing MUSIM assistance information may initiate the procedure if it was configured to do so, upon determining that it needs to leave RRC_CONNECTED state, or upon determining it needs the gaps, or upon change of the gap information.

If UE is configured to provide its release preference and timer T1 is not running and if the UE determines that it would prefer to transition out of RRC_CONNECTED state, UE start timer T1 with the timer value set to the releasePreferenceProhibitTimer and UE initiates transmission of the UEAssistanceInformation message to provide the release preference.

If UE is configured to provide MUSIM assistance information and if the UE needs to leave RRC_CONNECTED state, UE initiate transmission of the UEAssistanceInformation message to provide MUSIM assistance information and UE start the timer T2 with the timer value set to the MUSIM-LeaveWithoutResponseTimer.

If transmission of the UEAssistanceInformation message is initiated to provide a release preference, UE include releasePreference in the UEAssistanceInformation message. UE sets preferredRRC-State in releasePreference to the desired RRC state on transmission of the UEAssistanceInformation message.

If transmission of the UEAssistanceInformation message is initiated to provide MUSIM assistance information, UE includes musim-PreferredRRC-State in the UEAssistanceInformation. UE sets musim-PreferredRRC-State to the desired RRC state. preferredRRC-State is enumerated with IDLE and INACTIVE and CONNECTED and OUTOFCONNECTED. musim-PreferredRRC-State is enumerated with IDLE and INACTIVE.

GNB receives the UEAssistanceInformation message. GNB recognize that UE prefer RRC state transition for power saving purpose if UEAssistanceInformation includes releasePreference IE. GNB recognize that UE requests RRC state transition for MUSIM purpose if UEAssistanceInformation includes musim-PreferredRRC-State IE.

If GNB successfully receives the UEAssistanceInformation message, GNB would take proper measure such as commanding UE state transition.

If GNB fails to receive the UEAssistanceInformation message, GNB does not take proper measure. In such case, T2 may expire. GNB can also send mobility related RRC message if GNB deemed required. 2a-17 or 2a-19 take place in such case.

In 2a-17, T2 expires. UE performs the first action set, which are listed below.

UE resets MAC. UE stops all timers that are running except T302 (related to RRCRelease with waitTime), T320 (related to validity time configured for dedicated priorities), T325 (related to RRCRelease message with deprioritisation- Timer), T330 (related to LoggedMeasurementConfiguration), T331 (related to RRCRelease message with measIdleDuration) and T400 (related to RRCReconfigurationSidelink). UE stops T1 if running. UE releases all radio resources, including release of the RLC entity, the MAC configuration and the associated PDCP entity and SDAP for all established RBs. UE enter RRC_IDLE and perform cell selection.

In 2*a*-19, GNB may generates mobility related RRC message if UEAssistanceInformation is not received. Mobility related RRC message could be RRCReconfiguration message for handover or RRC reconfiguration message for conditional handover or MobilityFromNRCommand message.

RRCReconfiguration message for handover includes masterCellGroup IE which includes reconfigurationWithSync:

RRCReconfiguration message for conditional handover includes conditionalReconfiguration IE which includes another RRCReconfiguration message for handover.

MobilityFromNRCommand message is used to command handover from NR to E-UTRA/EPC, E-UTRA/5GC or UTRA-FDD. MobilityFromNRCommand message includes targetRAT-MessageContainer IE which carries information about the target cell identifier(s) and radio parameters relevant for the target radio access technology.

Upon receiving RRCReconfiguration message for handover, UE executes handover toward the cell indicated in RRCReconfiguration message and starts T304. UE initiates random access procedure in the target cell. If the random access procedure is successfully completed before T304 expires, UE consider the handover is successful.

After handover is successfully completed, UE checks whether the first condition set are met. If first condition set are met, UE performs the second action set. As consequence of second actions set UE transmits UEAssistanceInformation in the target cell and starts T2 to perform local release, if UE has transmitted UEAssistanceInformation in the source cell during the near fast.

First condition set includes following conditions.

If reconfigurationWithSync was included in masterCellGroup;

If the UE initiated transmission of a UEAssistanceInformation message during the last 1 second; and If the UE is still configured to provide the concerned UE assistance information The second action set includes followings.

UE stops T2 if running. UE initiates transmission of a UEAssistanceInformation message to provide the concerned UE assistance information. UE starts or restart T1 with the timer value set to the value of releasePreferenceProhibitTimer. UE starts T2 with the timer value set to the value of musim-LeaveWithoutResponseTimer.

The reason UE stops T2 upon receiving RRCReconfiguration message for handover is to prevent local RRC connection release while handover is ongoing.

Upon receiving RRCReconfiguration message for conditional handover, UE evaluates execution condition based on the information in received RRCReconfiguration. If execution condition is fulfilled, UE executes handover toward the cell indicated in RRCReconfiguration message and starts T304. UE initiates random access procedure in the target cell. If the random access procedure is successfully completed before T304 expires, UE consider the handover is successful.

After conditional handover (or conditional reconfiguration) is successfully completed, UE checks whether the second condition set are met. If the second condition set are met, UE performs the second action set.

Second condition set includes following conditions.

If reconfigurationWithSync was included in masterCellGroup; and

If the RRCReconfiguration message is applied due to a conditional reconfiguration execution; and If the UE is configured to provide UE assistance information; and If the UE has initiated transmission of a UEAssistanceInformation message since it was configured to do so.

As consequence of second actions set UE transmits UEAssistanceInformation in the target cell and starts T2 to perform local release, if UE has transmitted UEAssistanceInformation in any cell.

The different handling as above is to mitigate the difference between the handover and the conditional handover. GNB knows the exact time when handover is executed. GNB does not know exact time when conditional handover is executed.

Upon receiving MobilityFromNRCommand message, UE checks whether T2 is running. If T2 is running, UE delays performing the action set until T2 expires. Upon expiry of T2, UE applies the first action set.

Alternatively, UE stops T2 and performs the first action set.

If T2 is not running, UE applies third action set. The third action set includes followings.

UE access the target cell indicated in the inter-RAT message in accordance with the specifications of the target RAT. UE resets MAC. UE stops all timers (including T1) that are running except T325, T330 and T400. UE releases all radio resources, including release of the RLC entity and the MAC configuration. UE releases the associated PDCP entity and SDAP entity for all established RBs.

If handover or mobility from NR fails, UE may initiate RRC connection re-establishment procedure.

In 2*a*-21, UE initiates RRC re-establishment procedure. UE performs fourth action set upon initiation of the procedure. The fourth action set includes followings.

UE stops T310 (related to physical layer problem detection) and T304 (related to handover) and T1. UE starts T311. UE resets MAC. UE suspend all RBs except SRB0. UE performs cell selection.

Upon selecting a suitable NR cell, UE stops T311 and transmits RRCReestablishmentRequest message. If RRCReestablishment is received in response to RRCReestablishmentRequest, UE re-establishes the RRC connection based on the received RRC message.

If a suitable cell is not found until T311 expires, UE stops T2 and performs the first action set.

If GNB has received UEAssistanceInformation transmitted in 2*a*-15, GNB can transmits RRCRelease message for state transition instead of transmitting mobility related RRC message.

In 2*a*-23, GNB transmits RRCRelease message to UE. The RRCRelease message includes SuspendConfig.

Upon reception of RRCRelease, UE stops T2 and UE delays the fifth action set 60 ms from the moment the RRCRelease message was received or optionally when lower layers indicate that the receipt of the RRCRelease message has been successfully acknowledged, whichever is earlier.

Upon reception of RRCRelease, UE stops T2 before applying 60 ms delay and performs fifth action set after 60 ms delay.

UE stops timer T380 and T320 and T316 and T350. UE applies the received suspendConfig. UE resets MAC and releases the default MAC Cell Group configuration. UE re-establishes RLC entities for SRB1. UE stores in the UE Inactive AS Context the current KgNB and KRRCint keys, the ROHC state, the stored QoS flow to DRB mapping rules, the C-RNTI used in the source PCell, the cellIdentity and the physical cell identity of the source PCell.

By applying 60 ms delay, UE can transmit RLC acknowledgement for RRCRelease message. However, if 60 ms delay is applied to T2 stoppage, T2 may expire to cause state transition to IDLE state before RLC acknowledgement is transmitted.

Figure 3:
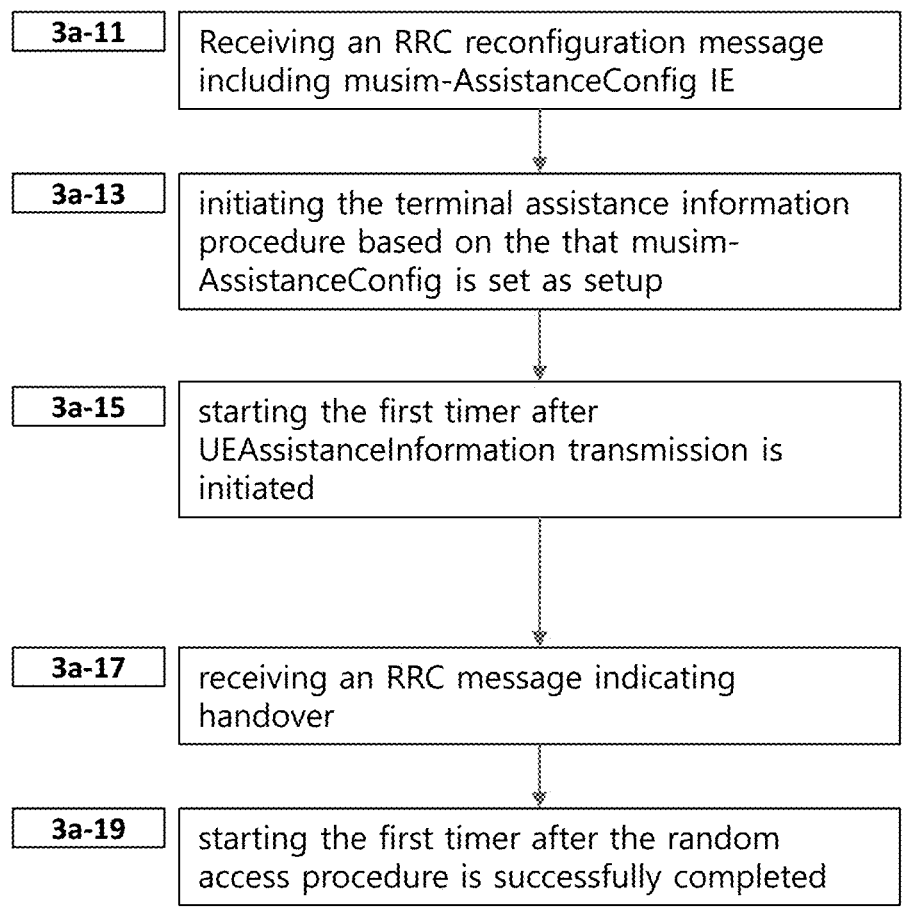
FIG. 3 is a flow diagram illustrating an operation of a terminal.

FIG. 3 illustrates the operation of the terminal.

In step 3a-11, the terminal receives an RRC reconfiguration message including musim-AssistanceConfig IE from the base station.

In step 3a-13, the terminal initiates the terminal assistance information procedure based on the that musim-AssistanceConfig is set as setup.

In step 3a-15, if the UEAssistanceInformation includes the musim-PreferredRRC-State IE, the UE starts the first timer after UEAssistanceInformation transmission is initiated.

In step 3a-17, the terminal receives an RRC message indicating handover.

In step 3a-19, if reconfigurationWithSync is included in the masterCellGroup of the RRC message and transmission of the UEAssistanceInformation message has been initiated during the last 1 second, the terminal starts the first timer after the random access procedure is successfully completed.

Musim-AssistanceConfig IE includes LeaveWithoutRespnoseTimer, the timer value of the first timer is set to LeaveWithoutResponseTimer, When the first timer expires, all radio resources are released and the RRC_IDLE state is entered.

The RRC message is an RRCReconfiguration message including a masterCellGroup IE including a ReconfigWithSync IE, or an RRCReconfiguration message including another RRCReconfiguration message including a masterCellGroup IE including a ReconfigWithSync IE, or a MobilityFromNRCommand message including an inter-RAT message.

If reconfigurationWithSync is included in the masterCellGroup of the RRC message and if part of the RRC message is applied due to conditional reconfiguration execution and if transmission of the UEAssistanceInformation message has been initiated after the UE is configured to provide MUSIM assistance information, terminal starts or restart the first timer after successful completion of the random access procedure.

The terminal stops the first timer before starting UEAssistanceInformation transmission after successful completion of the random access procedure.

If the RRC message is MobilityFromNRCommand and the first timer is running, the terminal stops the first timer.

If the RRC message is MobilityFromNRCommand and the first timer is not running, the UE accesses the target cell indicated in the inter-RAT message.

The reconfigurationWithSync includes parameters for synchronization reconfiguration to the target SpCell.

The masterCellGroup is master cell group configuration information, and may include radio bearer configuration information, SpCell configuration information, and cell group physical layer configuration information.

Prior to receiving the first RRC reconfiguration message, the UE transmits UECapabilityInformation including the UE Capability IE related to the first timer. If the UE Capability IE related to the first timer is included in the UECapabilityInformation, the function related to the first timer Is supported by FDD and TDD and FR1 and FR2.

Figure 4A:
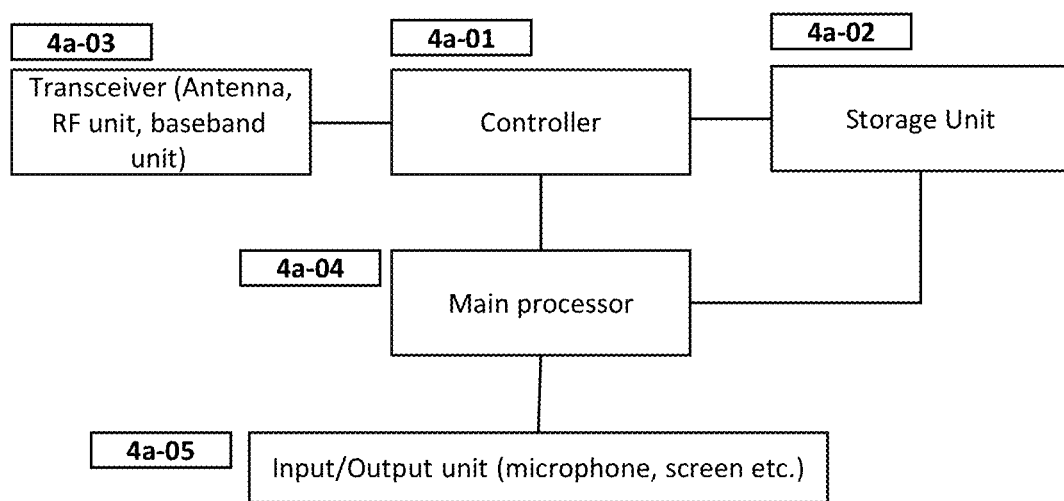
FIG. 4A is a block diagram illustrating the internal structure of a UE to which the disclosure is applied.

FIG. 4A is a block diagram illustrating the internal structure of a UE to which the disclosure is applied.

Referring to the diagram, the UE includes a controller 4a-01, a storage unit 4a-02, a transceiver 4a-03, a main processor 4a-04 and I/O unit 4a-05.

The controller 4a-01 controls the overall operations of the UE in terms of mobile communication. For example, the controller 4a-01 receives/transmits signals through the transceiver 4a-03. In addition, the controller 4a-01 records and reads data in the storage unit 4a-02. To this end, the controller 4a-01 includes at least one processor. For example, the controller 4a-01 may include a communication processor (CP) that performs control for communication and an application processor (AP) that controls the upper layer, such as an application program. The controller controls storage unit and transceiver such that UE operations illustrated in FIG. 2 and FIG. 3 are performed.

The storage unit 4a-02 stores data for operation of the UE, such as a basic program, an application program, and configuration information. The storage unit 4a-02 provides stored data at a request of the controller 4a-01.

The transceiver 4a-03 consists of a RF processor, a baseband processor and plurality of antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 4a-04 controls the overall operations other than mobile operation. The main processor 4a-04 process user input received from I/O unit 4a-05, stores data in the storage unit 4a-02, controls the controller 4a-01 for required mobile communication operations and forward user data to I/O unit (905).

I/O unit 4a-05 consists of equipment for inputting user data and for outputting user data such as a microphone and a screen. I/O unit 4a-05 performs inputting and outputting user data based on the main processor's instruction.

Figure 4B:
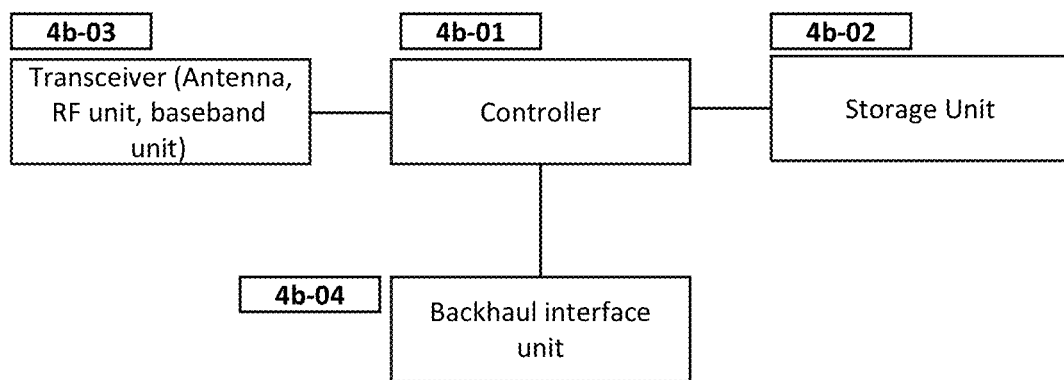
FIG. 4B is a block diagram illustrating the configuration of a base station according to the disclosure.

FIG. 4B is a block diagram illustrating the configuration of a base station according to the disclosure.

As illustrated in the diagram, the base station includes a controller 4b-01, a storage unit 4b-02, a transceiver 4b-03 and a backhaul interface unit 4b-04.

The controller 4b-01 controls the overall operations of the main base station. For example, the controller 4b-01 receives/transmits signals through the transceiver 4b-03, or through the backhaul interface unit 4b-04. In addition, the controller 4b-01 records and reads data in the storage unit 4b-02. To this end, the controller 4b-01 may include at least one processor. The controller controls transceiver, storage unit and backhaul interface such that base station operation illustrated in FIG. 2 are performed.

The storage unit 4b-02 stores data for operation of the main base station, such as a basic program, an application program, and configuration information. Particularly, the storage unit 4b-02 may store information regarding a bearer allocated to an accessed UE, a measurement result reported from the accessed UE, and the like. In addition, the storage unit 4b-02 may store information serving as a criterion to deter mine whether to provide the UE with multi-connection or to discontinue the same. In addition, the storage unit 4b-02 provides stored data at a request of the controller 4b-01.

The transceiver 4b-03 consists of a RF processor, a baseband processor and plurality of antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 4b-04 provides an interface for communicating with other nodes inside the network. The backhaul interface unit 4b-04 converts a bit string transmitted from the base station to another node, for example, another base station or a core network, into a physical signal, and converts a physical signal received from the other node into a bit string.

What is claimed is:

1. A method by a terminal, the method comprising:
    receiving by the terminal from a base station a first RRCReconfiguration, the first RRCReconfiguration includes a configuration information related to terminal state transition, the configuration information related to terminal state transition includes information for a first timer, the first timer is a timer related to terminal state transition;
    transmitting by the terminal to the base station a UEAssistanceInformation, the UEAssistanceInformation includes information related to terminal's state;
    starting by the terminal the first timer after initiating transmission of the UEAssistanceInformation;
    receiving by the terminal from the base station a second RRCReconfiguration, the second RRCReconfiguration includes a ReconfigurationWithSync;
    transmitting by the terminal to the base station a RRCReconfigurationComplete in response to the second RRCReconfiguration; and
    starting by the terminal the first timer if the reconfigurationWithSync was included in a masterCellGroup in the second RRCReconfiguration and if the terminal initiated transmission of the UEAssistanceInformation during a specific time period.

2. The method of claim 1,
    wherein the terminal starts the timer if the reconfigurationWithSync is included in a masterCellGroup in a third RRCReconfiguration and if the third RRCReconfiguration is applied due to conditional reconfiguration execution and if the terminal initiated transmission of the UEAssistanceInformation after the terminal is configured to provide MUSIM assistance information, the third RRCReconfiguration is included in the second RRCReconfiguration.

3. A terminal in a wireless communication system, the terminal comprising:
    a transceiver configured to transmit and receive a signal; and
    a controller configured to control the transceiver to:
    receive from a base station a first RRCReconfiguration, the first RRCReconfiguration includes a configuration information related to terminal state transition, the configuration information related to terminal state transition includes information for a first timer, the first timer is a timer related to terminal state transition;
    transmit to the base station a UEAssistanceInformation, the UEAssistanceInformation includes information related to terminal's state;
    start the first timer after initiating transmission of the UEAssistanceInformation;
    receive from the base station a second RRCReconfiguration, the second RRCReconfiguration includes a ReconfigurationWithSync;
    transmit to the base station a RRCReconfigurationComplete in response to the second RRCReconfiguration; and
    start the first timer if the reconfigurationWithSync is included in a masterCellGroup in the second RRCReconfiguration and if the terminal initiated transmission of the UEAssistanceInformation during a specific time period.

* * * * *